Jan. 29, 1957
E. R. LIGON
2,779,056
METHOD AND APPARATUS FOR FORMING
PLASTIC JOINTS ON CLAY PIPE
Filed Feb. 16, 1956
6 Sheets-Sheet 2
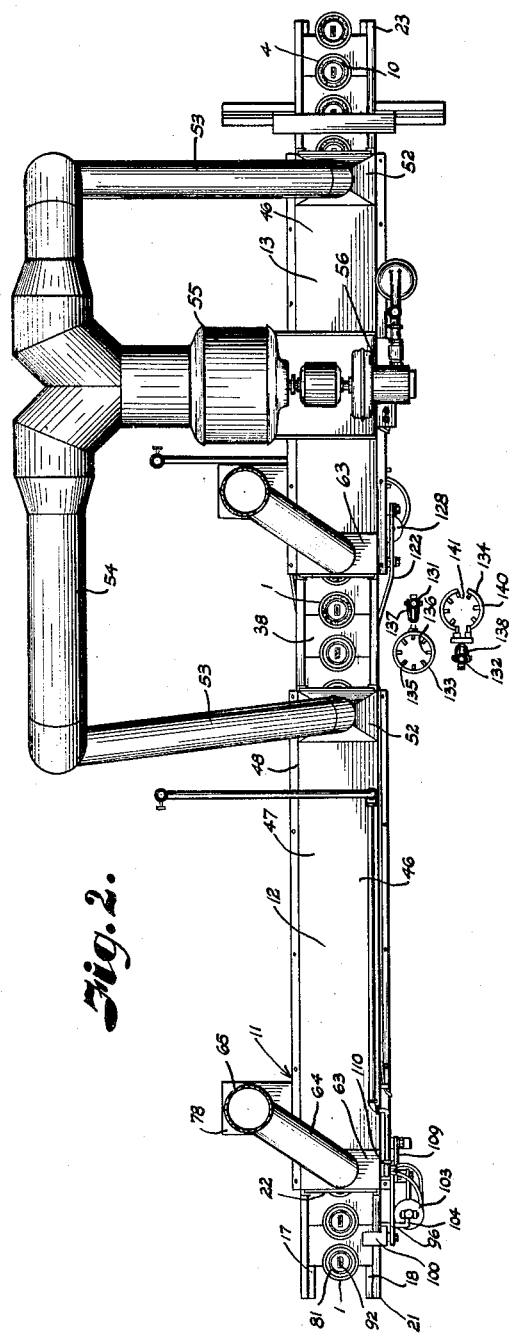
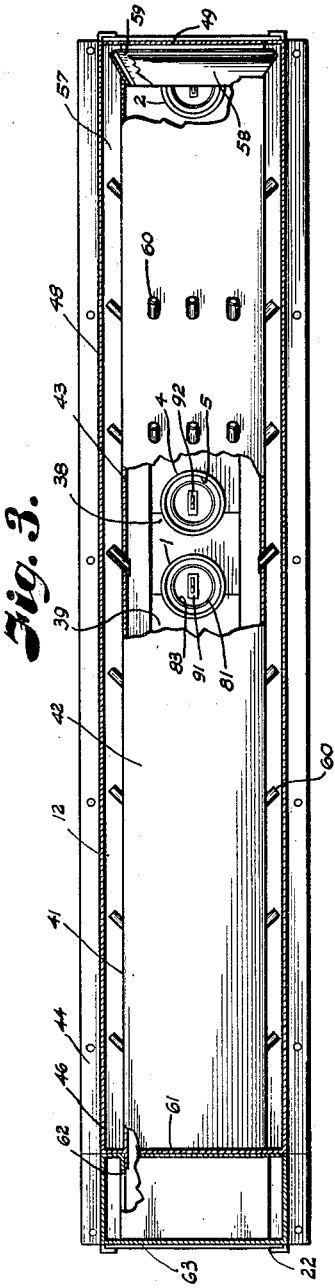
INVENTOR.
Elmer R. Ligon.
BY
Fishburn and Gold
ATTORNEYS.

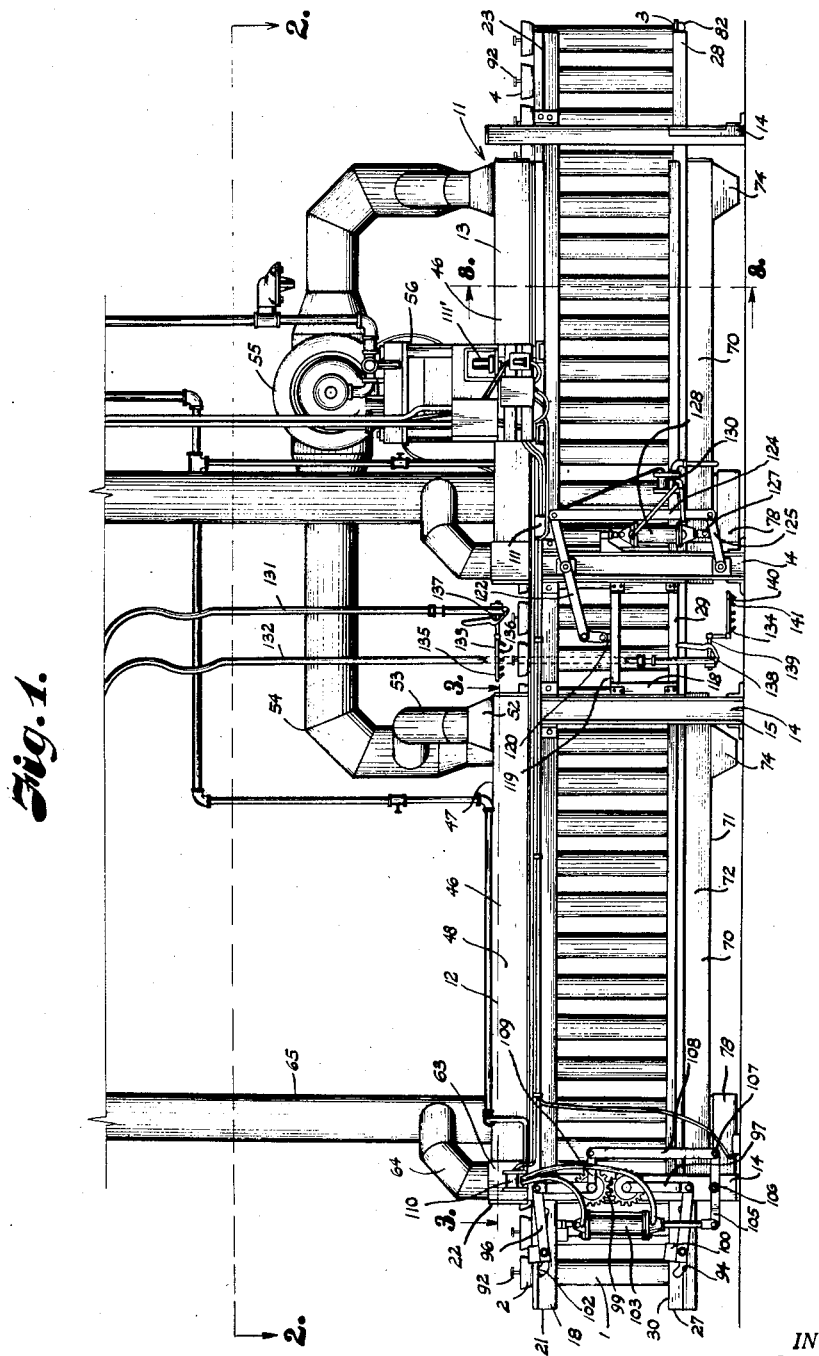

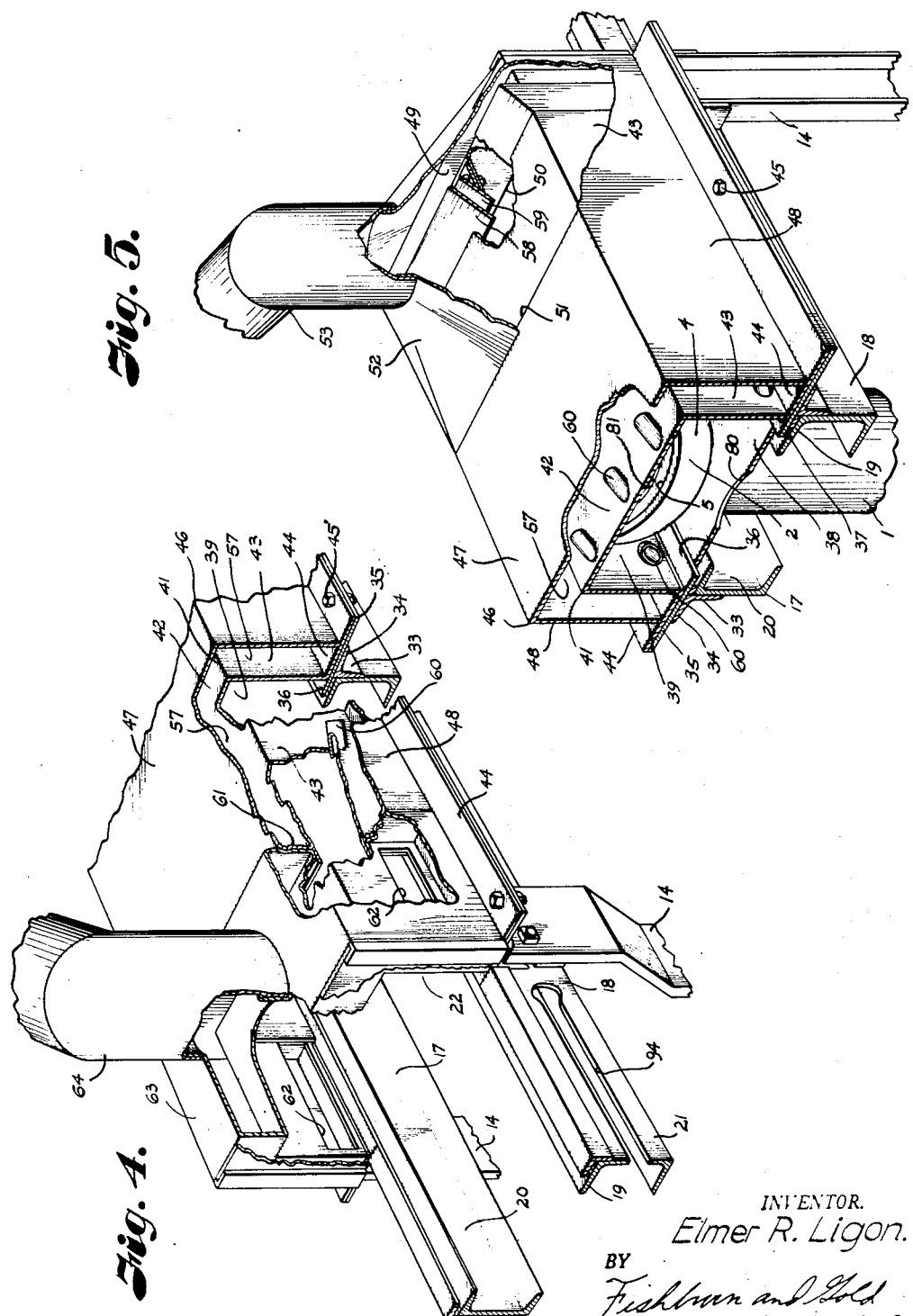

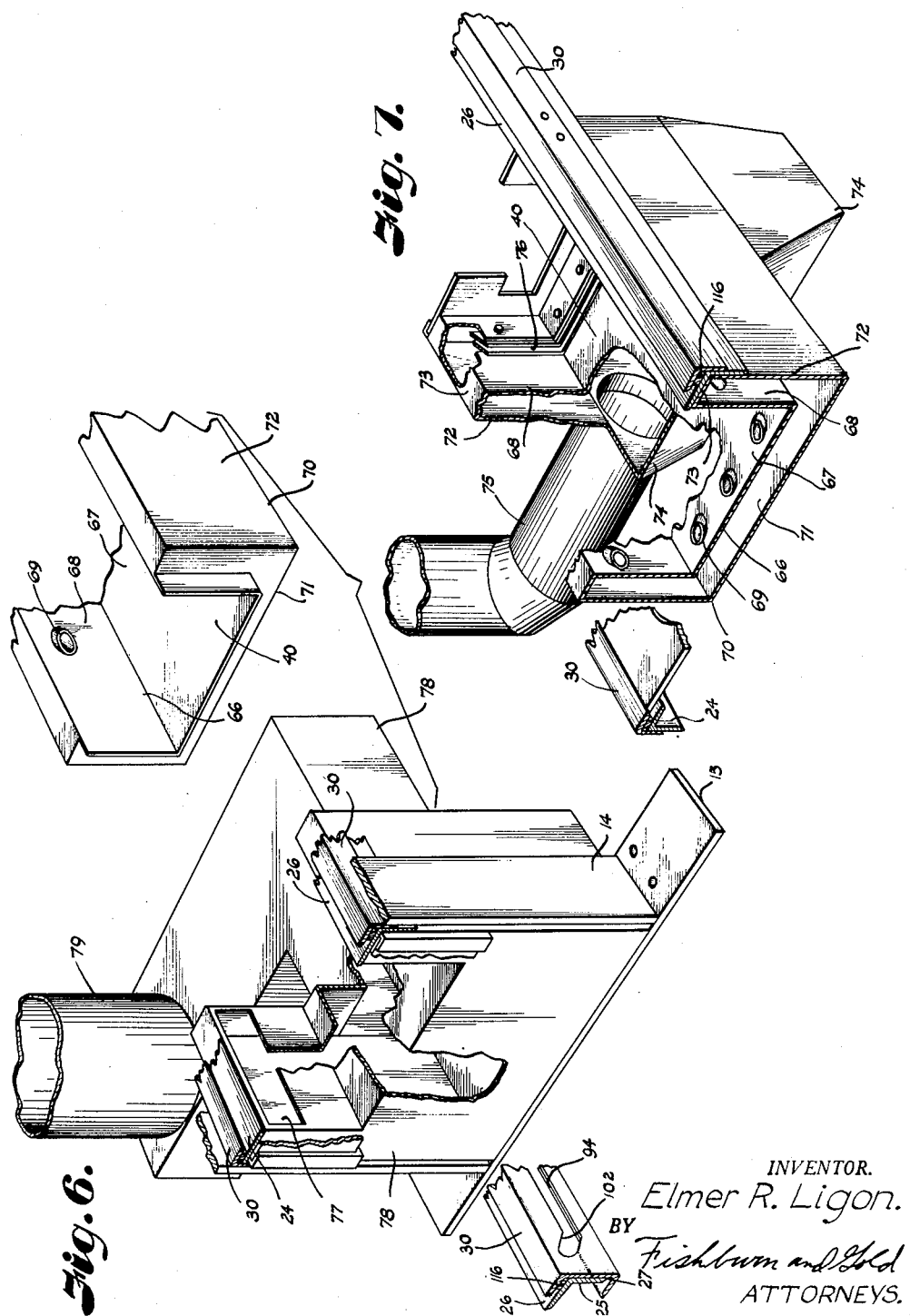

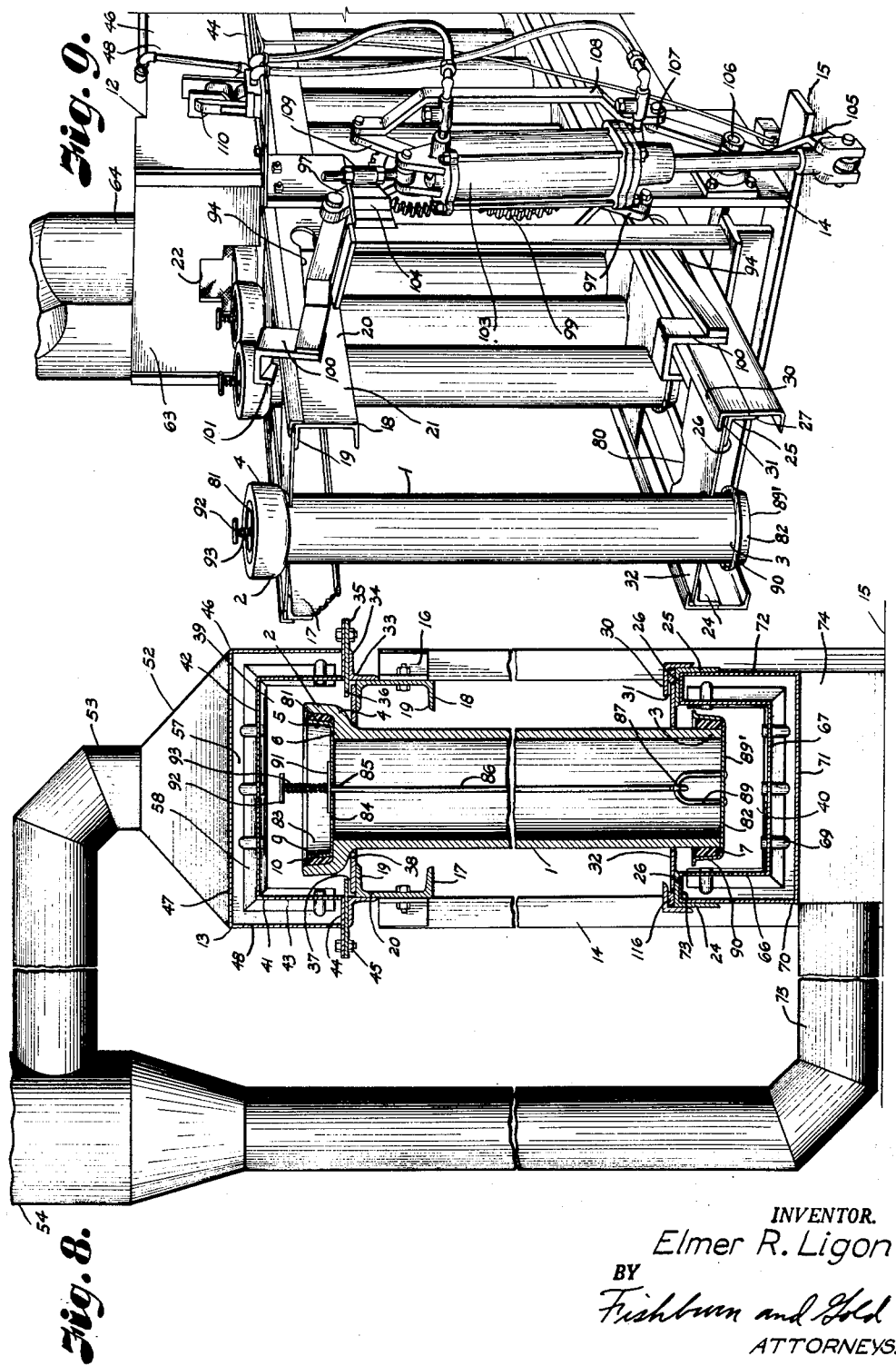

Jan. 29, 1957  E. R. LIGON  2,779,056
METHOD AND APPARATUS FOR FORMING
PLASTIC JOINTS ON CLAY PIPE
Filed Feb. 16, 1956  6 Sheets-Sheet 6
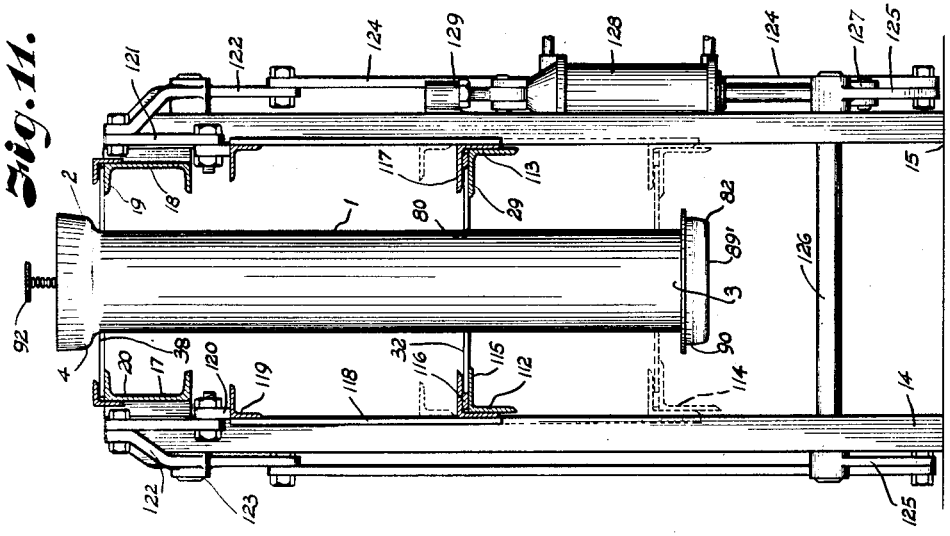
INVENTOR.
Elmer R. Ligon.
BY Fishburn and Gold
ATTORNEYS.

United States Patent Office 2,779,056
Patented Jan. 29, 1957

2,779,056

METHOD AND APPARATUS FOR FORMING PLASTIC JOINTS ON CLAY PIPE

Elmer R. Ligon, Pittsburg, Kans., assignor to W. S. Dickey Clay Manufacturing Company, Kansas City, Mo., a corporation of Delaware Application February 16, 1956, Serial No. 565,893

16 Claims. (Cl. 18—4)

This invention relates to the forming of joint sealing material or gaskets in clay pipe and the like having bell and spigot ends, and more particularly to the method and apparatus for forming and curing gaskets of synthetic resin material on the spigot end and in the bell end of clay and like pipe whereby the finished pipe sections may be forced together and the gasketed ends form a relatively tight joint therebetween.

Ceramic or clay tile or pipe, such as sewer pipe, vary in size and shape due to shrinkage during drying of the clay article and to distortion resulting from the expansion and contraction during firing and cooling of the article. This variation in shape and size requires a loose fit between the bell and spigot ends of adjacent sections, and in the past various types of mortar, cement and asphalt, and other bituminous compositions, have been used to fill and seal the space between the interior of the bell and exterior of the spigot ends of two connected pipe sections. Plastic sealing material, such as synthetic resins, have been utilized for such gaskets, but difficulties have been experienced in obtaining suitable adherence between the synthetic resin and the clay pipe. It has been found that a suitable synthetic resin material for gaskets on clay pipe is polyvinylchloride in dioctal phthalate with suitable fillers such as silica, flour, limestone and the like. However, even with a suitable resin, the placing of the pipe ends in molds, elimination of moisture, the pouring time of the viscose synthetic resin and the fusing of the gasket material on the pipe in curing of said material to obtain good adhesion to the pipe, has presented difficulty. The required time and energy and the heating of the pipe in such operations has also presented difficulties of handling quantities thereof to the extent that the cost of such joints has been considered excessive, if not prohibitive. The nature of the clay pipe being of low specific heat or heat conductivity usually causes a long time interval to be required to preheat same to a temperature at or above the fusion point of the synthetic resin as is necessary for good adhesion of the synthetic resin to the pipe as the mass of the pipe is very great compared to the mold and plastic or synthetic resin material.

The objects of the present invention are to provide a method and apparatus for applying synthetic resin and like gaskets to ceramic or clay tile or pipe which eliminates the difficulties mentioned in the above; to provide for jetting high temperature air on the ends only of such pipe to quickly raise the temperature of said ends to or above the fusing temperature of the gasket material to be applied; to provide for a continuous pipe treating and gasket applying apparatus wherein the intermediate portion between the heated ends of the pipe remains relatively cool and the gasketed pipe may be removed and handled without gloves; to provide such an apparatus including elongated structures enclosing tunnel-like passages that are open at their ends and through which the pipes are moved by conveying means with heated gaseous fluid circulated through the structure and jetted into the tunnel onto the ends of the pipe to create a heating zone that occupies substantially the length of the passages; to provide such an apparatus with adjustable heating chambers for treating pipe of different lengths; to provide such an apparatus with vertically spaced heating chambers into which the pipe ends extend and pipe supporting members serve as air seals closing the area around the pipe ends and also as a pipe conveyor; to provide flow of hot air for the heating of the pipe ends wherein the flow is countercurrent to the direction of travel of the pipe; to provide such apparatus with a pouring station at which the gasket molds or forms are accessible for applying the gasket material to the pipe ends; to provide pouring heads adapted to embrace the pipe and interlocking mechanism for holding the pipe against advancement in the apparatus until pouring is completed and the heads removed; to provide a method by which synthetic resin is adhered or fused to the pipe without mold gaskets and without leakage of the resin between the edges of the mold and irregular surfaces of the pipe; and to provide a sequence of method steps and apparatus for fusing synthetic resin gaskets on ends of clay or like pipe for tight adherence of the gasket material on the pipe and that operates in an economical and efficient manner to provide such gaskets in the pipe at relatively low cost.

In accomplishing these and other objects of the present invention, I have provided improved details of structure, the preferred form of which is illustrated in the accompanying drawings, wherein:

Fig. 1 is a side elevation of the apparatus for carrying the pipe, preheating same, applying the gasket material thereto and fusing said material to the pipe.

Fig. 2 is a horizontal view of the apparatus taken on the line 2—2, Fig. 1.

Fig. 3 is a horizontal sectional view through the bell end heating chamber taken on the line 3—3, Fig. 1.

Fig. 4 is a partial perspective view of the inlet end of one of the bell end heating chambers.

Fig. 5 is a partial perspective view of the other end of the heating chamber shown in Fig. 4.

Fig. 6 is a partial perspective view of the inlet end of the spigot preheating chamber in disassembled relation.

Fig. 7 is a partial perspective view of the outlet end of the spigot preheating chamber.

Fig. 8 is a vertical sectional view through the gasket fusing structure taken on the line 8—8, Fig. 1.

Fig. 9 is a perspective view of the apparatus at the entry end thereof, particularly showing the pipe advancing apparatus.

Fig. 10 is a vertical sectional view through the pipe supporting structure at the entry into the apparatus.

Fig. 11 is a vertical sectional view through the pipe supporting apparatus at the pouring station with the pipe supporting plates that normally engage the lower end of the pipe in elevated position for the pouring of gasket material in the spigot end mold, the normal position of the plates being shown in dotted lines.

Referring more in detail to the drawings:

1 designates a tubular clay or ceramic tile having end portions 2 and 3, the end portion 2 having an enlarged bell 4 forming an open socket 5 which may be slightly tapered in an inward direction and which terminates at its base in a flat angular shoulder or abutment 6. The other end portion 3 is substantially straight and adapted to be projected into the bell or socket portion 5. A collar or band portion 7 of suitable gasket material such as synthetic resin is arranged on the outer surface of the spigot end 3 and is preferably slightly tapered toward the open end to substantially conform to the tapered inner surface 9 of a lining 10 of suitable gasket material such as synthetic resin in the bell end portion of the tile. The synthetic resin is fused to the adjacent surfaces of the tile and the tapered outer surface of the collar on the spigot end is of a shape and size whereby the spigot end may be inserted in the lined bell end of the tile and forced together in a manner that the engaging surfaces of the synthetic resin will form a tight joint.

11 generally designates the apparatus for forming and fusing the gasket material or synthetic resin on the spigot end and in the bell end of the tile, said apparatus including spaced longitudinally aligned heating areas 12 and 13 through which the tile is moved for pre-heating portions of the tile in the heating areas 12 and fusing synthetic resin in and on the tile in the heating area 13, the synthetic resin being placed in molds on the ends of the tile in a pouring area while the tile is between the adjacent ends of the heating areas. Each of the heating areas 12 and 13 include ovens which are substantially the same construction; therefore, the oven structure in the heating area 12 will be described in detail and it is to be understood that the same detail will apply to the ovens in the heating area 13.

The oven in the heating area 12 consists of spaced legs 14 having lower ends suitably supported on a floor or the like 15 and their upper portions suitably connected as by brackets 16 to laterally spaced longitudinal track members 17 and 18 which in the illustrated structure are formed of structural channels with flanges 19 turned inwardly and the web 20 arranged in vertical planes, the inner edges of the flanges 19 of the channels 17 and 18 having greater spacing than the diameter of the tile adapted to be heated in the ovens. The channel members 17 and 18 have extensions 21 extending from the inlet ends 22 of the heating area 12 and said channel members 17 are of such length or formed of end to end connected members whereby they extend through the heating area 12, between the heating area 12 and heating area 13, through the heating area 13 and terminate in extensions 23 at the opposite end of the heating area 13. Spaced structural members 24 and 25 such as angles are supported on the posts 14 with flanges 26 extending inwardly in a plane substantially parallel to the plane of the flanges of the channel members 17 and 18 and spaced downwardly from the upper flange of said channels a distance slightly less than the spacing between the bell end of the tile to be processed and the upper end of the collar 7 to be applied to the spigot end of the tile. The members 24 and 25 serve as tracks and have extensions 27 extending from the inlet end 22 of the heating area 12 and extend through the heating area to the outlet or other end thereof in alignment with corresponding track members in the heating area 13 which have extensions 28 extending from the outlet end thereof substantially coextensive with the extensions 23. The adjacent ends of the members 24 and 25 are adapted to have a movable track member 29 aligned therewith in the space between the heating areas 12 and 13, as later described. Guide members are suitably secured relative to the members 24 and 25 whereby flanges 30 thereof extend inwardly over the flanges 26 in spaced relation thereto to define a channel 31 for receiving opposite edges of plates 32. Members 33 are suitably secured relative to the members 17 and 18 which include outwardly directed flanges 34 on which are mounted plates 35 having inner portions 36 extending inwardly over the flanges 19 in spaced relation thereto to provide channels 37 for tile supporting plates 38 whereby the plates 32 and 38 are moved through the heating areas and carry the tiles 1 to be processed with the bell end in a passage 39 and the spigot end in a passage 40 through which heating medium is moved to heat the respective ends of the tile.

The passage 39 is defined by a casing 41 having a top wall 42 and side walls 43 depending from the side edges of the top wall, the side walls 43 being secured to outwardly extending bottom plates 44 that are secured by suitable fastening devices 45 to the plates 35. An outer shell 46 encloses the casing 41 and consists of a top wall 47 spaced from the top wall 42 and depending side walls 48 spaced from the side walls 43, the lower edges of the walls 48 being connected to the bottom plates 44. At the outlet end of the heating areas, the shell 46 is provided with an end wall 49 having an opening 50 substantially registering with the passage in the casing 41. In the end portion of the shell is an opening 51 providing communication with the interior of an outlet connection 52 of a duct 53 which connects with a manifold duct 54 having communication with a blower 55 which draws air through a suitable furnace 56 whereby the air is heated and is delivered under pressure to the space 57 between the casing 41 and the shell 46, the air flowing through such space counter-current to the direction of movement of the tile through the heating area. It is to be understood where the term "hot air" is used that such term is meant to cover air with or without products of combustion. Spaced louver members 58 and 59 are suitably supported on the end of the casing 41 and end wall 49 to define a slot through which a portion of the air from the duct 53 is directed into the passage 39 with the greater volume of the air flowing through the space 57 between the casing and shell. The side and top walls of the casing 41 have a plurality of spaced nozzles 60 arranged along the length of the passage and at an angle thereto whereby said nozzles respectively deliver a plurality of streams of hot air to the surfaces of the tile ends being conveyed through the passage 39. Adjacent the end 22 of the heating area, the shell 46 has an end wall 61 having its inner edges connected to the casing 41 and the portion of the casing between the wall 61 and the end 22 of the heating area is provided with a plurality of relatively large openings 62 which communicate with a housing 63 that surrounds that portion of the casing and has communication with a duct 64 leading to a stack 65 for discharge of the hot air that has moved through the heating area. The hot air drawn off from the stack 65 may be discharged into the atmosphere or portions recirculated through the heating areas if desired.

The passage 40 is similarly constructed and defined only smaller than the passage 39, the passage 40 being defined by a casing 66 which is inverted relative to the casing 41 and is provided with a bottom wall 67 and upwardly extending side walls 68 each of which has a plurality of spaced nozzles 69 therein. A shell 70 surrounds the casing 66 and has a bottom wall 71 and side walls 72 spaced from the walls of the casing. The upper edges of the walls 68 and 72 are connected by a top plate 73. The end portions of the casing 66 and shell 70 are constructed in a similar manner to the respective ends of the casing 41 and shell 46 with the space between the casing and shell communicating with the interior of a housing 74 which communicates with a duct 75 that connects with the manifold duct 54 whereby hot air from the manifold 54 is delivered through the duct 75 and housing 74 and directed through louvers 76 into the passage 40 adjacent the outlet end thereof and through nozzles 69 along the length of the passage, and at the inlet end the heated air passes through enlarged openings 77 in the casing 66 into a housing 78 to a duct 79 connected with the stack 65. The casing 66 and housing 70 are suitably secured to the track members 24 and 25 as illustrated in Fig. 8.

The plates 32 and 38 are flat and are of suitable width whereby the side edges thereof are slidably supported by the flanges 26 and 19 respectively and the end edges each have centrally located semi-circular cut-out portions 80 to engage around the barrel portion of the tile 1 whereby the spacing between the cut-outs 80 is the spacing between the barrel portions of the tiles as they are moved through the heating areas. The plates 38 and bell end of the tiles cooperate to substantially close the bottom of the passage 39 and the plates 32 and spigot end of the tiles cooperate to substantially close the upper portion of the passage 40. Before the tiles 1 are placed in the apparatus for movement through the heating areas, molds 81 and 82 are arranged at the bell and spigot ends thereof respectively. The mold 81 is a cup-like member with a substantially circular wall 83 having an outer surface conforming to the shape and size of the desired inner surface of the lining 10. The bottom 84 of the mold 81 rests on the shoulder 6 of the tile and said bottom has an opening 85 centrally arranged therein through which a rod 86 extends. The lower end of the rod has a hook 87 thereon adapted to engage a U-shaped member 89 fastened to the bottom wall 89' of the mold 82, said bottom wall being adapted to engage the end of the spigot end of the tile. The mold 82 has an upwardly-outwardly inclined circular wall 90 having an inner surface corresponding to the shape and size of the collar 7 to be applied to the spigot end of the tile. The rod 86 extends through a plate 91 which rests on the bottom wall 84 of the mold member 81 and also has a handle 92 at the upper end with a spring 93 sleeved on the rod between the handle and the plate 91 whereby the spring urges the wall 84 in engagement with the shoulder 6 and the wall 89 in engagement with the end of the spigot end of the tile to hold the mold members in position.

A plate 38 is placed on the flanges 19 and a plate 32 placed on the flanges 26, and then a tile 1 with the mold members therein is arranged in the cut-out portions 80 at the rear of the plates and the tile and plates pushed on the track members toward the heating area 12. Then additional plates 38 and 32 are placed on the flanges 19 and 26 respectively, and the cut-out portions 80 at the forward edge thereof engaged with the tile 1. Then additional tile is placed on the successive plates and the tile and plates moved along the tracks whereby the plates carry the tile and the pushing of the rearmost plate moves the tiles and plates through the heating areas.

In order to effect movement of the plates and tiles supported thereby through the heating areas, the extensions 21 and 27 are each provided with elongated slots 94 in the vertical webs thereof in which operate rollers 95 rotatably mounted on end portions of arms 96, the other ends of which are pivotally connected to arms 97 which have opposite ends secured to hubs 98 of rotatably mounted meshing gears 99 whereby controlled oscillation of the arms 97 move the arms 98 and the slots 94 control the motion of the rearmost portion of the arms 96. Fingers 100 are secured to the ends of the arms 96 adjacent the rollers 95 and extend upwardly and inwardly and then downwardly whereby lugs 101 are engageable with the plates 38 and 32 inwardly from the inner edges of the flanges 18 and 26. The end of the slots 94 toward the entry end of the extensions 21 and 26 is provided with an upturned portion 102 whereby when the arms 96 are at the rearmost position of the travel, the lugs 101 are elevated to permit the plates 38 and 32 to be moved thereunder and beyond same whereby movement of the arms 96 toward the heating area will move the plates and the tile carried thereon. The movement of the arms and meshing gears is effected by an hydraulic extensible member 103 having one end suitably supported by a frame member 104 and the other end pivotally connected to a lever 105 pivotally mounted as at 106 and with the opposite end 107 connected by a link 108 to an arm 109 that is secured to the upper gear hub 97 as illustrated in Fig. 1. Fluid under pressure for operating the hydraulic extensible member 103 is controlled by a valve 110 which is preferably of a solenoid type providing remote control for the extensible means and advancement of the plates and tile through the apparatus. Current for the solenoid valve 110 is controlled by a switch 111 preferably adjacent the entry end of the heating area 13, the current being supplied from an electric control panel 111' on which is provided conventional master switches, fuses and other electric controls for the valve operating circuits as well as for the fuel supply circuits to the furnace 56.

In the space between the heating areas 12 and 13, track portions 112 and 113 are shown in the form of structural angles normally supported in the position as shown in dotted lines as at 114 whereby the flanges 115 of said angles align with the flanges 26 of the track members 24 and 25 in the heating areas 12 and 13. The track members 24 and 25 are also arranged with spacers 116 and members having flanges 117 secured thereto in overlying spaced relation to the flanges 115 to form guides for the side edges of the plates 32. The track and flange member assemblies are of such length that the ends thereof substantially abut and align with the track members 24 and 25 and angle members 30 whereby when the track members 112 and 113 are in normal position there is a continuous track through the apparatus for the plates 32. The track members 112 and 113 and flange members 117 associated therewith are each supported on the lower ends of slides 118 that engage spaced posts 14 or other suitable vertically arranged guide members. The upper ends of the slide members 118 on each side of the apparatus are connected by beams 119 which have upstanding centrally located ears 120 each connected by links 121 to adjacent ends of arms 122 pivotally mounted as at 123 on each side of the apparatus. The arms 122 are connected by links 124 to arms 125 that each have one end fixed to a shaft 126 that extends transversely of the apparatus below the path of travel of the tiles 1. The arm 125 is pivotally connected as at 127 to an hydraulic extensible member 128 which has its other end suitably secured to a mounting bracket 129 on one of the posts or other frame members of the apparatus. Fluid for actuating the hydraulic extensible member is under the control of a solenoid valve 130 whereby when the extensible member is extended the arms 125 are swung downwardly rotating the shaft 126 whereby the arms swing together and through the links 124 swing the arms 122 to raise the slide members 118 and the tracks 112 and 113 and the plates 32 supported thereon whereby the plates slide upwardly on the tile 1 and provide sufficient space therebetween for insertion of devices for pouring or otherwise applying synthetic resin material to the mold 82 to form the collar 7.

The solenoid valve 110 and 130 are each preferably arranged whereby fluid under pressure is applied to one or the other end of the extensible members at all times and are arranged in the circuit in connection with the switch 111 whereby when the solenoid valve 130 is energized and the track members 112 and 113 in elevated position the solenoid valve 110 holds the pressure in the extensible member 103 to retain the fingers 100 and rollers 95 on the levers 96 in the upturned portion 102 of the slots 94 with an interlock whereby the solenoid valve 110 cannot be operated to effect movement of the plates and tile carried thereby until the track members 112 and 113 are returned to their lowered normal position. In the same manner, while the extensible means 103 is effecting movement of the plates and tile carried thereby through the apparatus, the interlock prevents the actuation of the solenoid valve 130 and extensible member 128 until after the extensible member 103 has completed its cycle of operation.

The synthetic resin applied to the molds 81 and 82 is preferably supplied in liquid or other flowable condition under suitable pressure through pipes 131 and 132 to nozzle heads 133 and 134 respectively. The nozzle head 133 is arranged for filling of the mold 81 and includes a tube 135 arranged in a circular shape with inwardly and downwardly directed nozzles 136 positioned for flowing the synthetic resin in the space between the inner surface of the bell end of the pipe or tile and the wall 83 of the mold. The tube 135 communicates with the pipe 131 through a valve 137 that controls the flow of the synthetic resin through the nozzles 136. A similar valve 138 is arranged in the pipe 132 to control flow of the synthetic resin through a tube 139 to a pair of tubes 140 each arranged in the substantially semi-circular shape and having downwardly and inwardly turned nozzles 141 whereby when the head members 140 are positioned around the barrel of the pipe above the mold 82 and the valve 138 opened, the nozzles will direct synthetic resin into the mold 82 between the spigot end of the pipe and the wall 90 of the mold to form the collar 7, these mold filling operations being performed when the track members 112 and 113 are in elevated position. The tile with the synthetic resin in the molds is advanced through the heating area 13 to fuse the synthetic resin to the tile and as they move onto the extensions 23 and 28 the tile is removed and the molds disassembled therefrom.

In operating the apparatus assembled as described and performing the method of fusing the joint material to the tile, the furnace 56 is operated to provide heated air to the blower 55 whereby air at approximately 650° F. is jetted through the nozzles 60 and 69 and louvers 58 and 59 and 76 at velocities of 700 to 1,000 cubic feet per minute. Then the molds 81 and 82 are applied to the tiles 1 and plates 38 and 32 placed on the flanges of the track members 17, 18, 24 and 25 of the extensions 21 and 27, and the tiles 1 with the molds therein placed in the cut-out portions 80 of the plates whereby the tiles are supported by said plates. Then the switch mechanism 111 is operated to energize the solenoid valve 110 to actuate the extensible member 103 whereby the arms 96 are reciprocated to move the plates and tile thereon into the heating area 12. Additional tile and plates are inserted in the apparatus and continued to be advanced by actuating of the extensible member 103 to move the tile through the heating area 12, it being preferred that the heating area be of such length and the movement of the tile therethrough in normal procedure whereby the ends of the tile are heated to approximately 190° to 200° F. The apparatus as illustrated is preferably such that the tile will remain in the heating area 12 for approximately six minutes during its movement through the passages 39 and 40. As the tile leaves the heating area 12, it enters the pouring space between the heating area 12 and 13 and the switch 111 is operated to energize the solenoid valve 130 to actuate the extensible member 128 to lift the track members 112 and 113 and the plates 32 thereon. Then the pouring heads 133 and 134 are moved into position to align the nozzles 136 and 141 with the space in the mold to be filled by synthetic resin and the valves 131 and 138 operated to flow the synthetic resin into the mold. It is preferable that the valves 137 and 138 be opened initially for each tile to flow only enough of the synthetic resin into the mold to substantially cover the bottom of the recess formed thereby with the tile and then the valves 137 and 138 closed for a few seconds' time to allow partial setting of the synthetic resin to form a gasket sealing small openings between the surface of the mold and the adjacent portion of the mold. In this manner, an effective seal of any possible leaks between the mold and tile is closed without the use of soft foamy plastics such as silicones as would be necessary to seal the leaks if the synthetic resin was poured into tile at ordinary room temperatures. After a few seconds in which the initial synthetic resin seals such leaks, the valves 137 and 138 are again opened to flow sufficient synthetic resin into the mold cavities to fill same to the desired length of the liner 10 and collar 7. Then, the heads 133 and 134 are removed from the tile and the extensible member 128 reversed to lower the track members 112 and 113 into normal position and extensible member 103 again actuated to move the tile and plates to advance same through the apparatus. Additional tiles and plates are placed on the extensions 21 and 27 during the time the synthetic resin is being poured into the molds at the pouring station between the heating areas 12 and 13. This operation is continued and the advancing of the tile through the apparatus moves the tile through the heating area 13 which also is jetting air at temperatures of approximately 650° F. and at velocities of 700 to 1,000 cubic feet per minute to further heat the ends of the tile, molds and synthetic resin therein to approximately 375° F. to fuse the synthetic resin to the tile and provide good adhesion thereto. The heating of the tile in the heating area 12 not only prepares the tile for receiving the synthetic resin in a manner to eliminate additional sealing material to prevent leaks between the mold and irregular surface of the tile but also assures the pipe being dry before the synthetic resin is placed in the mold cavity. This drying of the tile aids in assuring good adhesion of the synthetic resin to the tile. The viscous nature of the synthetic resin causes it to flow slowly in the mold and therefore the plurality of pouring nozzles aid in providing more uniform level of the synthetic resin in a minimum of time so as to assure substantially a level surface of the synthetic resin in the mold. The insertion of additional tile, moving same into the heating area 12 and pouring the synthetic resin in the tiles as they pass through the pouring space is continued whereby the tile moves from the heating area 13 at a rate whereby it will be subjected to the heat as above specified for approximately six minutes for 4-inch tile, and then the tiles move on to the extensions 23 and 28 from which they are lifted. While the ends of the tile come from the heating area 13 at a temperature of approximately 375° F., the central portion of the barrel, due to the low conductivity of the tile, remains at a relatively low temperature whereby an operator can remove the tile by grasping the center portion of the barrel without gloves and place same in a storage for cooling after which the molds are removed from the tile to leave a finished tile with a synthetic joint material as a liner in the bell end and as a collar on the spigot end, each of suitable size whereby the spigot end can be inserted in an aligned bell end of an adjacent tile and the two tiles forced together to make a tight joint.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. The method of applying and fusing joint material to ends of clay and like pipe which comprises, placing molds on the ends of the pipe to define cavities therewith for receiving joint material, subjecting only the ends of the pipe and molds to heating and drying medium to dry and preheat the ends of the pipe while the portion of the pipe between the heated ends remains substantially unheated, inserting flowable joint material into the cavities between the heated molds and pipe ends to suitably fill said mold cavities, subjecting only the ends of the pipe and molds with joint material therein to heating medium to heat said ends to fuse the joint material to the pipe while the portion of the pipe between the heated ends remains substantially unheated, and removing the molds from the pipe.

2. The method of applying and fusing joint material to ends of clay and like pipe which comprises, placing molds on the ends of the pipe to define end cavities therewith for receiving joint material, subjecting only the ends of the pipe and molds to heating and drying medium to dry and preheat the ends of the pipe while the portion of the pipe between the heated ends remains substantially unheated, inserting flowable joint material into the cavities between the heated molds and pipe ends to cover engaged portions of the mold and pipe, allowing the joint material to partially set, inserting an additional quantity of flowable joint material to suitably fill said mold cavities, subjecting only the ends of the pipe and molds with joint material therein to heating medium to heat said ends to fuse the joint material to the pipe while the portion of the pipe between the heated ends remains substantially unheated, and removing the molds from the pipe.

3. The method of applying and fusing joint material to ends of clay and like pipe which comprises, placing molds on the ends of the pipe to define cavities therewith for receiving joint material, subjecting only the ends of the pipe and molds to the action of forcibly projected streams of heating and drying medium to dry and preheat the ends of the pipe to 190° to 200° F., while the portion of the pipe between the heated ends remains substantially unheated, exposing the mold cavities, inserting flowable joint material into the cavities between the heated molds and pipe ends to cover engaged portions of the mold and pipe, allowing the joint material to partially set, inserting an additional quantity of flowable joint material to suitably fill said mold cavities, subjecting only the ends of the pipe and molds with joint material therein to forcibly projected streams of heating medium to heat said ends to approximately 375° F. to fuse the joint material to the pipe while the portion of the pipe between the heated ends remains substantially unheated, and removing the molds from the pipe.

4. The method of applying and fusing joint material to ends of clay and like pipe which comprises, placing molds on the ends of the pipe to define cavities therewith for receiving joint material, conveying the molds and pipe through spaced heating areas into which the ends of the pipe extend, subjecting only the ends of the pipe and molds to heating and drying medium to dry and preheat the ends of the pipe while the portion of the pipe between the heating areas remains substantially unheated, conveying the heated pipe and molds from the heating areas to a pouring zone, inserting flowable joint material into the cavities between the heated molds and pipe ends to suitably fill said mold cavities, conveying the pipe and molds with the joint material therein through second spaced heating areas into which the ends of the pipe extend, subjecting only the ends of the pipe and molds with joint material therein to heating medium to heat said ends to fuse the joint material to the pipe while the portion of the pipe between the heated ends remains substantially unheated, conveying the pipe from the second heating areas, and removing the molds from the pipe.

5. The method of applying and fusing joint material to ends of clay and like pipe which comprises, placing molds on the ends of the pipe to define cavities therewith for receiving joint material, conveying the molds and pipe through spaced heating areas into which the ends of the pipe extend, subjecting only the ends of the pipe and molds to heating and drying medium to dry and preheat the ends of the pipe while the portion of the pipe between the heating areas remains substantially unheated, conveying the heated pipe and molds from the heating areas to a pouring zone, inserting flowable joint material into the cavities between the heated molds and pipe ends to cover engaged portions of the molds and pipe, allowing the joint material to partially set, inserting an additional quantity of flowable joint material to suitably fill said mold cavities, conveying the pipe and molds with the joint material therein through second spaced heating areas into which the ends of the pipe extend, subjecting only the ends of the pipe and molds with joint material therein to heating medium to heat said ends to fuse the joint material to the pipe while the portion of the pipe between the heated ends remain substantially unheated, conveying the pipe from the second heating areas, and removing the molds from the pipe.

6. The method of applying and fusing joint material to ends of clay and like pipe which comprises, placing molds on the ends of the pipe to define cavities therewith for receiving joint material, conveying the molds and pipe through spaced heating areas into which the ends of the pipe extend, subjecting only the ends of the pipe and molds to the action of a plurality of jets respectively adapted to deliver forcibly projected streams of heating and drying medium thereon to dry and preheat the ends of the pipe to 190° to 200° F. while the portion of the pipe between the heating areas remains substantially unheated, conveying the heated pipe and molds from the heating areas to a pouring zone, exposing the mold cavities, inserting flowable joint material into the cavities between the heated molds and pipe ends to cover engaged portions of the molds and pipe, allowing the joint material to partially set, inserting an additional quantity of flowable joint material to suitably fill said mold cavities, conveying the pipe and molds with the joint material therein through second spaced heating areas into which the ends of the pipe extend, subjecting only the ends of the pipe and molds with joint material therein to the action of a plurality of jets respectively adapted to deliver forcibly projected streams of heating medium thereon to heat said ends to approximately 375° F. to fuse the joint material to the pipe while the portion of the pipe between the heated ends remains substantially unheated, conveying the pipe from the second heating areas, and removing the molds from the pipe.

7. The method of applying and fusing synthetic resin joint material to ends of clay and like pipe which comprises, placing molds on the ends of the pipe to define cavities therewith for receiving synthetic resin joint material, conveying the molds and pipe through spaced heating areas into which the ends of the pipe extend, subjecting only the ends of the pipe and molds to heating and drying medium to dry and preheat the ends of the pipe while the portion of the pipe between the heating areas remains substantially unheated, removing the heating medium from the heating areas at a point remote from its entry thereto for effecting flow of the heating medium through the heating area counter-current to direction of movement of the pipe therethrough, conveying the heated pipe and molds from the heating areas to a pouring zone, exposing the mold cavities, inserting flowable synthetic resin joint material into the cavities between the heated molds and pipe ends to cover engaged portions of the molds and pipe, allowing the joint material to partially set, inserting an additional quantity of the same flowable synthetic resin joint material to suitably fill said mold cavities, conveying the pipe and molds with the synthetic resin joint material therein through second spaced heating areas into which the ends of the pipe extend, subjecting only the ends of the pipe and molds with the synthetic resin joint material therein to heating medium to heat said ends to fuse the synthetic resin joint material to the pipe while the portion of the pipe between the heated ends remains substantially unheated, removing the heating medium from the second heating areas at a point remote from its entry thereto for effecting flow of the heating medium through the second heating areas counter-current to the direction of movement of the pipe therethrough, conveying the pipe and molds with the joint material therein from the second heating areas, and removing the molds from the pipe leaving the synthetic resin joint material on the ends thereof whereby when the ends of the pipe are forced into adjacent pipe the joint material will provide an effective seal for the connected ends.

8. The method of applying and fusing synthetic resin joint material to ends of clay and like pipe which comprises, placing molds on the ends of the pipe to define cavities therewith for receiving synthetic resin joint material, conveying the molds and pipe through spaced heating areas into which the ends of the pipe extend, subjecting only the ends of the pipe and molds to the action of a plurality of jets respectively adapted to deliver forcibly projected streams of heating and drying medium thereon to dry and preheat the ends of the pipe to 190° to 200° F. while the portion of the pipe between the heating areas remains substantially unheated, removing the heating medium from the heating areas at a point remote from its entry thereto for effecting flow of the heating medium through the heating area counter-current to direction of movement of the pipe therethrough, conveying the heated pipe and molds from the heating areas to a pouring zone, exposing the mold cavities, inserting flowable synthetic resin joint material into the cavities between the heated molds and pipe ends to cover engaged portions of the molds and pipe, allowing the joint material to partially set, inserting an additional quantity of the same flowable synthetic resin joint material to suitably fill said mold cavities, conveying the pipe and molds with the synthetic resin joint material therein through second spaced heating areas into which the ends of the pipe extend, subjecting only the ends of the pipe and molds with the synthetic resin joint material therein to the action of a plurality of jets respectively adapted to deliver forcibly projected streams of heating medium thereon to heat said ends to approximately 375° F. to fuse the synthetic resin joint material to the pipe while the portion of the pipe between the heated ends remains substantially unheated, removing the heating medium from the second heating areas at a point remote from its entry thereto for effecting flow of the heating medium through the second heating areas countercurrent to the direction of movement of the pipe therethrough, conveying the pipe and molds with the joint material therein from the second heating areas, and removing the molds from the pipe leaving the synthetic resin joint material on the ends thereof whereby when the ends of the pipe are forced into adjacent pipe the joint material will provide an effective seal for the connected ends.

9. Apparatus for applying and fusing joint material to the bell and spigot ends of clay and like pipe on which mold members are removably mounted to define cavities for receiving the joint material at said ends of the pipe comprising, a support, pairs of laterally spaced track members carried on the support with one pair of said track members vertically spaced from the other pair, conveying means removably carried by the respective pairs of track members and movable longitudinally therealong, said conveying members on the pairs of track members having portions engaging the pipe to be treated adjacent the bell and spigot ends, means operable to simultaneously engage the conveying means on each pair of track members and move same with the pipe longitudinally of the track members, means, including a plurality of nozzles, for supplying heating medium and directing forcibly projected streams thereof to the ends of the pipe for heating only the ends of the pipe and molds thereon, means for flowing joint material into the mold cavities of the heated pipe, and means including a plurality of nozzles supplying heating medium and directing forcibly projected streams thereof onto the ends of the pipes and molds thereon whereby the pipe ends and joint material are heated to fuse the joint material to the pipe with the portion of the pipe between the ends substantially unheated for handling and for removing the pipe from the conveying means on the track members.

10. Apparatus for applying and fusing joint material to the bell and spigot ends of clay and like pipe on which mold members are removably mounted to define cavities for receiving the joint material at said ends of the pipe comprising, a support, pairs of laterally spaced track members carried on the support with one pair of said track members vertically spaced from the other pair, conveying means carried by the respective pairs of track members and movable longitudinally therealong, said conveying members on the pairs of track members having portions engaging the pipe to be treated adjacent the bell and spigot ends, longitudinally spaced elongate hollow casings supported over the uppermost pair of track members and cooperating with the conveying means thereon to define a passage through which the bell ends of the pipe are moved, longitudinally spaced elongate hollow casings supported under the other track members and cooperating with the conveying means thereon to define passages through which the spigot ends of the pipe are moved, the hollow casings being in groups with the hollow casing above the uppermost pair of track members of each group being over the respective hollow casings that are under the other pair of track members, means supplying heating medium to the hollow casing including a plurality of nozzles for directing streams of heating medium to the ends of the pipe in the passages, means between the longitudinally spaced hollow casings operable to raise the conveying means on the lower pair track members to expose the molds on the spigot end of the pipe, means between the longitudinally spaced groups of hollow casings for flowing joint material into the mold cavities, and means operable to engage the conveying means to move same with the pipes longitudinally of the track members whereby the pipes and molds thereon are moved through the passages in one group of the hollow casings to preheat and dry only the pipe ends and molds thereon for receiving the joint material at adjacent the outlet ends of said one group of hollow casings and then the pipe and molds and joint material therein are moved through the other group of hollow casings whereby the ends and joint material are heated to fuse the joint material to the pipe with the portion of the pipe between the ends substantially unheated for handling at the outlet end of the said other group of hollow casings for removing the pipe from the conveying means on the track members.

11. Apparatus for applying and fusing joint material to the bell and spigot ends of clay and the like pipe on which mold members are removably mounted to define cavities for receiving the joint material at said ends of the pipe comprising, a support, pairs of laterally spaced track members carried on the support with one pair of said track members vertically spaced from the other pair, conveying means removably carried by the respective pairs of track members and movable longitudinally therealong, said conveying members on the pairs of track members having portions engaging and supporting the pipe to be treated adjacent the bell and spigot ends, longitudinally spaced hollow elongate casings supported over the uppermost pair of track members and cooperating with the conveying means thereon to define a passage through which the bell ends of the pipe are moved, longitudinally spaced elongate hollow casings supported under the other track members and cooperating with the conveying means thereon to define passages through which the spigot ends of the pipe are moved, the hollow casings being in groups with the hollow casing above the uppermost pair of track members of each group being over the respective hollow casing that is under the other pair of track members, means supplying heating medium to the hollow casings including a plurality of transversely and longitudinally spaced nozzles for directing forcibly projected streams of heating medium to the ends of the pipe in the passages, said hollow casings having outlets for the heating medium at points spaced from the entry thereof whereby the heating medium moves through the passages counter-current to the direction of movement of the pipes, means between the longitudinally spaced group of hollow casings operable to raise the conveying means on the lower pair of track members to expose the molds on the spigot end of the pipe, means between the longitudinally spaced groups of hollow casings for flowing joint material into the mold cavities, and means operable to simultaneously engage the conveying means on each of the pairs of track members to move same with the pipes longitudinally of the track members whereby the pipes and molds thereon are moved through the passages in one group of the hollow casings to preheat and dry only the pipe ends and molds thereon for receiving the joint material at adjacent the outlet ends of said one group of hollow casings and then the pipe and molds and joint material therein are moved through the other group of hollow casings whereby the ends and joint material are heated to fuse the joint material to the pipe with the portion of the pipe between the ends substantially unheated for handling at the outlet end of the said other group of hollow casings for removing the pipe from the conveying means on the track members.

12. Apparatus for applying and fusing joint material to the bell and spigot ends of clay and like pipe comprising, molds removably mounted on the pipe to be treated and cooperating therewith to define cavities for receiving joint material at the bell and spigot ends of the pipe, a support, laterally spaced track members carried on the support, second laterally spaced track members carried on the support in vertically spaced relation to the first-named track members, conveying means removably carried by the first- and second-named track members and movable longitudinally therealong, said conveying means on the second-named track members having portions engaging the pipe adjacent and under the bell ends to support said pipe for movement along the track members, said conveying means on the first-named track members having portions engaging the pipe adjacent the spigot end to maintain same in vertical alignment with the bell ends, means operable to engage the conveying means on the first- and second-named track members to move same with the pipe longitudinally of the track members, an elongated hollow casing supported over the second-named track members and cooperating with the conveying means thereon to define a passage through which the bell end of the pipe is moved, a second elongated hollow casing supported under the first-named track members and cooperating with the conveying means thereon to define a second passage through which the spigot end of the pipe is moved, means supplying heating medium to the hollow casings for heating the ends of the pipe in the passages, means at the ends of the hollow casings for flowing joint material into the mold cavities, and means for heating the ends of the pipe and molds with the joint material therein for fusing the joint material to the pipe.

13. Apparatus for applying and fusing joint material to the bell and spigot ends of clay and like pipe comprising, molds removably mounted on the pipe to be treated and cooperating therewith to define cavities for receiving joint material at the bell and spigot ends of the pipe, a support, laterally spaced track members carried on the support, second laterally spaced track members carried on the support in vertically spaced relation to the first-named track members, conveying means removably carried by the first- and second-named track members and movable longitudinally therealong, said conveying means on the second-named track members having portions engaging the pipe adjacent and under the bell ends to support said pipe for movement along the track members, said conveying means on the first-named track members having portions engaging the pipe adjacent the spigot end to maintain same in vertical alignment with the bell ends, means operable to engage the conveying means on the first- and second-named track members to move same with the pipe longitudinally of the track members, an elongated hollow casing supported over the second-named track members and cooperating with the conveying means thereon to define a passage through which the bell end of the pipe is moved, a second elongated hollow casing supported under the first-named track members and cooperating with the conveying means thereon to define a second passage through which the spigot end of the pipe is moved, the portion of the pipe between the conveying means on the first- and second-named track members being exposed to the atmosphere, means supplying heating medium to the hollow casings including a plurality of nozzles for directing forcibly projected streams of heating medium to the ends of the pipe in the passages, means at the ends of the hollow casings operable to raise the conveying means on the first-named track members to expose the mold on the spigot end of the pipe, means for flowing joint material into the mold cavities, and means for heating the ends of the pipe and molds with the joint material therein for fusing the joint material to the pipe.

14. Apparatus for applying and fusing joint material to the bell and spigot ends of clay and like pipe comprising, molds removably mounted on the pipe to be treated and cooperating therewith to define cavities for receiving joint material at the bell and spigot ends of the pipe, a support, laterally spaced track members carried on the support, second laterally spaced track members carried on the support in vertically spaced relation to the first-named track members, flat plate members removably carried by the first- and second-named track members and movable longitudinally therealong, said flat plate members on the second-named track members each having recessed portions on opposite ends for engaging the pipe adjacent and under the bell ends whereby two plate members cooperate to support a pipe for movement along the track members, said flat plate members on the first-named track members each having recessed portions on opposite ends for engaging the spigot end portions of adjacent pipe to maintain same in vertical alignment with the bell ends, means operable to simultaneously engage the flat plate members on the first- and second-named track members to move same with the respective pipe supported thereby longitudinally of the track members, an elongated hollow casing supported over the second-named track members and cooperating with the flat plate members thereon to define a passage through which the bell end of the pipe is moved, a second elongated hollow casing supported under the first-named track members and cooperating with the flat plate members thereon to define a second passage through which the spigot end of the pipe is moved, the portion of the pipe between the flat plate members on the first- and second-named track members being exposed to the atmosphere, means supplying heating medium to the hollow casings including a plurality of nozzles for directing forcibly projected streams of heating medium to the ends of the pipe in the passages, said hollow casings having outlets for the heating medium at points spaced from the entry thereof whereby the heating medium moves through the passages counter-current to the direction of movement of the pipes, means at the ends of the hollow casings operable to raise the flat plate members on the first-named track members to expose the mold on the spigot end of the pipe, means for flowing joint material into the mold cavities, and means for heating the ends of the pipe and molds with the joint material therein for fusing the joint material to the pipe.

15. Apparatus for applying and fusing joint material to the bell and spigot ends of clay and like pipe comprising, molds removably mounted on the pipe to be treated and cooperating therewith to define cavities for receiving joint material at the bell and spigot ends of the pipe, a support, laterally spaced track members carried on the support, second laterally spaced track members carried on the support in vertically spaced relation to the first-named track members, conveying means removably carried by the first- and second-named track members and movable longitudinally therealong, said conveying means on the second-named track members having portions engaging the pipe adjacent and under the bell ends to support said pipe for movement along the track members, said conveying means on the first-named track members having portions engaging the pipe adjacent the spigot end to maintain same in vertical alignment with the bell ends, means operable to engage the conveying means on the first- and second-named track members to move same with the pipe longitudinally of the track members, means for preheating only the pipe end portions and molds thereon to dry said end portions, means operable to raise the conveying means on the first-named track members to expose the mold on the spigot end of the preheated pipe, means for flowing joint material into the mold cavities, an elongated hollow casing supported over the second-named track members and cooperating with the conveying means thereon to define a passage through which the bell end of the pipe is moved, a second elongated hollow casing supported under the first-named track members and cooperating with the conveying means thereon to define a second passage through which the spigot end of the pipe is moved, the portion of the pipe between the conveying means on the first- and second-named track members being exposed to the atmosphere, and means supplying heating medium to the hollow casings including a plurality of nozzles for directing forcibly projected streams of heating medium to the ends of the pipe in the passages, said hollow casings having outlets for the heating medium at points spaced from the entry thereof for flow of the heating medium through the passages counter-current to the direction of movement of the pipes whereby the heating medium fuses the joint material to the pipe and the portions between the heated ends remains substantially unheated for handling and removing the pipe from the conveying means on the track members at the outlet end of the hollow casings.

16. Apparatus for applying and fusing joint material to the bell and spigot ends of clay and like pipe comprising, molds removably mounted on the pipe to be treated and cooperating therewith to define cavities for receiving joint material at the bell and spigot ends of the pipe, a support, laterally spaced track members carried on the support, second laterally spaced track members carried on the support in vertically spaced relation to the first-named track members, flat plates removably carried by the first- and second-named track members and movable longitudinally therealong, said flat plates on the second-named track members each having recessed portions in opposite ends thereof for engaging the pipe adjacent and under the bell ends whereby adjacent plates cooperate to support a pipe for movement along the track members, said flat plates on the first-named track members each having recessed portions in opposite ends thereof for engaging the pipe adjacent the spigot end to maintain same in vertical alignment with the bell ends, means operable to simultaneously engage the flat plates on the first- and second-named track members to move same with the respective pipe longitudinally of the track members, means for preheating only the pipe end portions and molds thereon to dry said end portions, means operable to raise certain flat plates on the first-named track members to expose the mold on the spigot end of the preheated pipe, means for flowing joint material into the mold cavities, an elongated hollow casing supported over the second-named track members and cooperating with the flat plates thereon to define a passage through which the bell end of the pipe is moved, a second elongated hollow casing supported under the first-named track members and cooperating with the flat plates thereon to define a second passage through which the spigot end of the pipe is moved, the portion of the pipe between the flat plates on the first- and second-named track members being exposed to the atmosphere, and means supplying heating medium to the hollow casings including a plurality of nozzles for directing forcibly projected streams of heating medium to the ends of the pipe in the passages, said hollow casings having outlets for the heating medium at points spaced from the entry thereof for flow of the heating medium through the passages counter-current to the direction of movement of the pipes whereby the heating medium fuses the joint material to the pipe and the portions between the heated ends remains substantially unheated for handling and removing the pipe from the flat plates on the track members at the outlet end of the hollow casings.

References Cited in the file of this patent

UNITED STATES PATENTS

| | | |
|---|---|---|
| 2,103,860 | Mazzeo | Dec. 28, 1937 |
| 2,292,366 | DeWyke | Aug. 11, 1942 |
| 2,342,920 | Clark | Feb. 29, 1944 |
| 2,732,584 | Bishop | Jan. 31, 1956 |

FOREIGN PATENTS

| | | |
|---|---|---|
| 743,452 | Great Britain | Jan. 18, 1956 |